United States Patent Office 2,941,963
Patented June 21, 1960

2,941,963

PROCESS FOR TREATING POLY(ALKYLENE OXIDE)

Frederick E. Bailey, Jr., and John T. Fitzpatrick, Charleston, W. Va., assignors to Union Carbide Corporation, a corporation of New York No Drawing. Filed June 27, 1957, Ser. No. 668,301

17 Claims. (Cl. 260—2)

This invention relates to the treatment of poly(alkylene oxide) containing residual basic catalyst.

Poly(ethylene oxide) having a reduced viscosity in acetonitrile above about 1.0 can be produced by the polymerization of ethylene oxide in the presence, for example, of alkaline earth metal amides, hexammoniates or the decomposition products of hexammoniates as polymerization catalyst therefor. The resulting ethylene oxide polymers are hard, tough, horny, water-soluble materials which are useful in various applications such as thickeners, sizes and binders. By conducting the above-described polymerization process in the presence of a liquid organic medium, hereinafter described, which is a solvent for ethylene oxide and a non-solvent for poly(ethylene oxide), with agitation of the reaction mixture, there can be obtained poly(ethylene oxide) in granular form. The process of preparing poly(ethylene oxide) in granular form has been termed "suspension polymerization" process.

By the term "reduced viscosity," as used herein, is meant a value obtained by dividing the specific viscosity of a given solution at a given temperature by the concentration of alkylene oxide polymer in the solution, the concentration being measured in grams of said polymer per 100 milliliters of solvent, and the reduced viscosity is regarded as a measure of molecular weight. The specific viscosity is obtained by dividing the difference between the viscosity of the solution and the viscosity of the solvent by the viscosity of the solvent. Unless otherwise stated, the reduced viscosities herein referred to are measured at a concentration of 0.2 gram of poly(ethylene oxide) in 100 milliliters of acetonitrile at 30° C. Also, unless otherwise stated herein, the reduced viscosity of the alkylene oxide polymers, particularly poly(ethylene oxide), has a value of at least 1.0 and upwards to 60, and higher.

The term "granular," as used herein, refers to the particle size of the alkylene oxide polymers, for example, poly(ethylene oxide) prepared by the suspension polymerization process. A granular polymer product is one which is in a free flowing state and comprises particles less than 5 mesh in size (U.S. standard size seive).

Many of the uses for ethylene oxide polymers having a reduced viscosity in acetonitrile above about 1.0 entail solution, oftentimes in water, as an essential step. As is well known a smaller particle size hastens solution and consequently facilitates the use of the polymers in applications requiring the use of solution. Conventional techniques can be employed to reduce the particle size of previously known solid polymers of ethylene oxide, such as by grinding, chipping, pulverizing and the like; however, such mechanical expedients are difficult and expensive. When a pellet (of the order, for example, of ¼ inch and upwards in diameter), particularly of the higher molecular weight poly(ethylene oxide), e.g., poly(ethylene oxide) with a reduced viscosity in acetonitrile above about 30, is placed in water, observations indicate that a surface layer of polymer swells. This layer apparently acts as a protective film. On shaking the pellet in water for a day or two, the swelled layer gradually penetrates the pellet converting the pellet into a gelatinous mass which finally goes into solution. Superficially it might appear that solution could be hastened by expedients such as high speed stirring. However, high molecular weight poly(ethylene oxide) is subject to shear degradation and, though solution can be hastened, the molecular weight can be reduced by such high speed stirring. Consequently, one advantage of preparing poly(ethylene oxide) in granular form is its relative ease of dissolution in liquid media whereas pelleted ethylene oxide polymer, e.g., of the order of ¼ inch and upwards in diameter, has a relatively slower rate of solution. Moreover, the use of mechanical expedients to decrease the size of pelleted poly(ethylene oxide) to a granular state or form can oftentimes result in reducing the molecular weight of said pelleted poly(ethylene oxide) which reduction may be undesirable.

However, granular poly(ethylene oxide) produced by the suspension polymerization process briefly described above and having a reduced viscosity in acetonitrile above about 1.0 and upwards to 60, and higher, generally contains as much as one or more weight percent, based on the weight of polymer, of residual basic catalyst. Aqueous solutions of these granular ethylene oxide polymers, particularly the more concentrated solutions, are cloudy and have a relatively high pH by virtue of this residual basic catalyst. These cloudy solutions are less suitable in many applications than clear solutions, and oftentimes, are not suitable at all. Moreover, these cloudy solutions in applications involving pumping technique have an undesirable abrasive action. Obvious methods of removing the residual catalyst, such as by dissolving the granular polymer in a liquid medium such as water, followed by filtration to remove the residual catalyst particles, are expensive operations and such methods result in the loss of the granular form of the polymer.

Accordingly, one or more of the following objects will be achieved by the practice of this invention. It is an object of this invention to provide a novel process wherein granular poly(ethylene oxide) containing residual basic catalyst is contacted with a non-solvent, organic vehicle, said organic vehicle containing acid soluble therein, the anion of which forms with the cation of said residual catalyst a water soluble salt. It is another object of this invention to provide a novel process for neutralizing residual basic catalyst contained in granular poly(ethylene oxide) having a reduced viscosity in acetonitrile above about 1.0, which comprises slurrying said granular poly(ethylene oxide) in a non-solvent, organic vehicle, said organic vehicle containing acid soluble therein an amount at least sufficient to neutralize said residual catalyst. It is a further object of this invention to provide a novel process for converting residual alkaline earth metal-containing catalyst contained in granular poly(ethylene oxide) which comprises admixing said granular poly(ethylene oxide) in a non-solvent, organic vehicle, which organic vehicle contains an acid soluble therein in an amount at least sufficient to convert said residual catalyst to a water-soluble salt while maintaining said poly(ethylene oxide) in its granular form. A yet further object of this invention is to provide granular poly(ethylene oxide) having a reduced viscosity in acetonitrile above about 1.0 which, when dissolved in water, yields transparent aqueous solutions. Other objects will become apparent to those skilled in the art in the light of the instant specification.

By the term "non-solvent, organic vehicle," as used herein, is meant a liquid organic medium of the type described hereinafter and in which granular poly(ethylene oxide) having a reduced viscosity in acetonitrile above about 1.0 is insoluble.

In accordance with the present invention granular poly(ethylene oxide) having a reduced viscosity in acetonitrile above about 1.0 and upwards to 60, and higher, and containing residual basic catalyst such as alkaline earth metal amides, hexammoniates or decomposition products of hexammoniates, is admixed or slurried with a non-solvent, organic vehicle, said organic vehicle containing acid soluble therein in an amount at least sufficient to neutralize the residual catalyst. The particular acid employed is one which, on neutralization with the residual basic catalyst yields a water-soluble salt, for example, a water-soluble alkaline earth metal salt. In other words, the choice of the acid is governed primarily by two considerations, namely, the acid should be soluble in the organic vehicle, and secondly, the anion of the acid should give a water-soluble salt with the cation of the residual basic catalyst.

The non-solvent, organic vehicles which are contemplated include, among others, the normally liquid saturated hydrocarbons such as the saturated aliphatic, saturated cycloaliphatic, and alkyl-substituted saturated cycloaliphatic hydrocarbons, and the like; organic ethers such as the dialkyl ethers, lower glycol dialkyl ethers, saturated cyclic organic ethers, and the like; normally liquid saturated hydrocarbon fractions derived from petroleum, and the like. Illustrative organic vehicles include pentane, hexane, isoheptane, heptane, ethylpentane, octane, nonane, decane, cyclopentane, cyclohexane, ethylcyclohexane, butylcyclohexane, 1,2-dimethylcyclohexane, decahydronaphthalene, dimethyl ether, dipropyl ether, methyl butyl ether, dibutyl ether, dihexyl ether, dioctyl ether, dimethyl-, diethyl-, dipropyl-, dibutyl ethers of ethylene and propylene, glycols, dioxane, and the like.

The quantity of organic vehicle necessary for treating the granular poly(ethylene oxide) is not narrowly critical. It has been observed that a poly(ethylene oxide) slurry containing up to approximately 30 weight percent of poly(ethylene oxide) based on the total weight of poly(ethylene oxide) and organic vehicle, is satisfactory. Concentrations of poly(ethylene oxide) above about 30 weight percent can be employed; however, the slurry becomes difficult to mix and consequently, such concentrations are not preferred. The upper limit regarding the quantity of organic vehicle which is employed is governed primarily by practical and economic considerations. A slurry containing as little as 2.0 weight percent of poly(ethylene oxide), and lower, based on the total weight of poly(ethylene oxide) and organic vehicle, is suitable. All factors considered, however, it is preferred to employ a slurry containing from about 5.0 to about 20.0 weight percent of poly(ethylene oxide), based on the total weight of poly(ethylene oxide) and organic vehicle.

Broadly speaking, the choice of the acid employed should satisfy the two conditions referred to previously, i.e., the acid should be soluble in the organic vehicle, and the acid anion should yield water-soluble salts. Consequently, sulfuric acid would not be desirable since, for example, alkaline earth metal sulfates are water-insoluble. The acids contemplated are the saturated aliphatic monocarboxylic acids such as formic acid, acetic acid, propionic acid, butyric acid, valeric acid, caproic acid, caprylic acid, and the like; the mineral acids such as hydrogen chloride, hydrogen bromide, nitric acid, and the like. Saturated aliphatic monocarboxylic acids containing from 1 to 3 carbon atoms per molecule are preferred. Mixtures of saturated aliphatic acids can be employed such as, for example, a mixture of acetic acid and propionic acid. Substantially anhydrous acid is preferably employed since poly(ethylene oxide) is soluble in water. Granular poly(ethylene oxide), once dissolved in water, is not obtained in its granular form upon removal of the water of solution. It has been discovered that a major advantage of poly(ethylene oxide) among water-soluble resins is its negligible biological oxygen demand. Resin containing calcium acetate will support the growth of mold, whereas calcium propionate is a mold growth inhibitor. Consequently, propionic acid is a particularly preferred acid, especially when the residual basic catalyst is a calcium-containing compound.

The minimum amount of acid necessary to effect the neutralization of the residual basic catalyst will depend, of course, predominantly on the quantity of said residual catalyst in the ethylene oxide polymer. Acid in an amount at least sufficient to neutralize the residual basic catalyst thereby yielding water-soluble alkaline earth metal salts is the preferred lower limit. The upper limitation regarding the amount of acid which can be employed is not narrowly critical. It is preferred that the upper limit of the acid employed be below that amount which appreciably softens the granular polymer. In general, the upper limit of the acid used can be as high as 20 weight percent, and higher, based on the weight of the organic vehicle. The amount of acid necessary to neutralize the residual basic catalyst, i.e., calcium, barium or strontium amide, hexammoniate or decomposition products of hexammoniate, contained in the poly(ethylene oxide) can be readily determined by well known analytical procedures. One suitable method is to dissolve a known quantity of basic catalyst-contaminated poly(ethylene oxide) in water and subsequently titrate the resulting solution to the end-point, by the careful addition thereto of a strong mineral acid.

The operative conditions for conducting the neutralization step are not narrowly critical. The contaminated granular ethylene oxide polymer can be slurried in the nonsolvent, organic vehicle containing acid soluble therein in an amount at least sufficient to neutralize the residual basic catalyst at ambient temperature and pressure, i.e., approximately 25° C. and atmospheric pressure. In principle, the operative temperature range can be between the freezing point and the boiling point of the particular non-solvent, organic vehicle employed. Subatmospheric, atmospheric, or superatmospheric pressures can be used. It is essential for efficient operation that the correlation of temperature and pressure be such that the non-solvent, organic vehicle does not evaporate or solidify. In general, a temperature in the range of from about 0° C. to about 60° C. is suitable. It is preferred, however, to conduct the process at a temperature in the range from about 20° C. to below about the print point of the polymer, e.g., below about 53° C. to 55° C. for granular poly(ethylene oxide). Operating within the preferred limits, a product is obtained at the completion of the process which substantially possesses its original granular characteristic.

The liquid-solid mixture comprising polymer, acid, and non-solvent, organic vehicle can be agitated for a period of time ranging, for example, from about two minutes to about two hours. In general, it has been observed that a period of time in the range from about five minutes to one hour gives effective results. Agitation may be effected by paddles, stirrers, tumbling or rolling the reaction vessel, and the like.

The treated granular poly(ethylene oxide) can be separated from the non-solvent, organic medium by conventional techniques such as, by decantation, filtration, and the like. If desired, the recovered granular polymer can be subjected to one or more organic washes with an organic non-solvent such as the saturated aliphatic hydrocarbons listed previously.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, filed May 29, 1956, and assigned to the same assignee as the instant application. The above-said application teaches the preparation of poly(ethylene oxide) by polymerizing ethylene oxide in contact with a polymerization catalyst therefor. The polymerization reaction is preferably conducted at a temperature in the range from about 0° C. to 70° C. and is carried out in the presence of a liquid organic medium which is a solvent for ethylene oxide and a non-solvent for poly(ethylene oxide). Agitation of the reaction mixture during the polymerization results in the production of granular ethylene oxide polymer having a reduced viscosity in acetonitrile above about 1.0, and generally above about 30.

Liquid organic media which can be used to prepare granular poly(ethylene oxide) are those which are inert to ethylene oxide and the catalyst employed, and in which monomeric ethylene oxide is soluble and ethylene oxide polymer having a reduced viscosity in acetonitrile above about 1.0 is insoluble. Illustrative organic media include the normally liquid straight and branch chain saturated hydrocarbons, cyclic and alkyl-substituted cyclic saturated hydrocarbons, and the like, e.g., pentane, hexane, heptane, isopentane, ethylpentane, the octanes, the decanes, cyclohexane, cyclopentane, methylcyclopentane, ethylcyclohexane, decahydronaphthalene, and the like; the normally liquid saturated ethers such as diethyl, dipropyl, dibutyl and the higher dialkyl ethers and the like; the cyclic ethers such as dioxane and the like; the lower glycol dialkyl ethers such as the dimethyl, diethyl, dipropyl and dibutyl ethers of ethylene and propylene glycols, and the like.

The polymerization reaction is conducted in the presence of catalysts which include the alkaline earth metal amides, hexammoniates or the decomposition products of hexammoniates.

The amides of calcium, strontium, and barium can be made by reacting the metal with liquid ammonia. However, the product of the reaction immediately obtained is not the amide but is a hexammoniate which can be symbolized by the formula $M(NH_3)_6$ wherein M can be calcium, strontium or barium. The hexammoniates spontaneously decompose with the evolution of hydrogen and ammonia to form the corresponding amides, $M(NH_2)_2$. Methods for preparing the amides are also disclosed in the articles of Bergstrom and Fernelius in Chem. Revs. 12, 43 (1933) and in Chem. Revs. 20, 413 (1937).

The preparation, storage and use of the amides, the hexammoniates, and the decomposition products of the hexammoniates are preferably conducted under conditions whereby water, oxygen, and other materials reactive with the metal, or the amides, are essentially excluded to maintain the catalytic activity of same during the polymerization reaction.

An antioxidant can be incorporated or added to the slurry comprising alkylene oxide polymer, non-solvent, organic vehicle, and acid, or after separating the polymer from the slurry at the termination of the process an antioxidant can be added to the recovered polymer. The antioxidant serves to stabilize the polymer against molecular degradation, for example, during storage and/or transit. Antioxidants contemplated include those which form the subject matter of application Serial No. 587,953, entitled "Chemical Process and Product," by F. N. Hill, filed May 29, 1956, and assigned to the same assignee as the instant application. Among the antioxidants disclosed in the above-mentioned application are various 2-hydroxyalkyl-substituted alkylenediamines such as N,N-di(2 - hydroxypropyl)-N',N'-di(2-hydroxyethyl)ethylenediamine, N,N,N'-tri(2-hydroxypropyl)-N'-(2 - hydroxyethyl)ethylenediamine, N,N,N',N'-tetrakis(2 - hydroxypropyl)ethylene diamine. Advantageous results are obtained by employing these antioxidants at a concentration in the range from about 0.5 to 5 weight percent, and higher, based on the polymer weight.

In Example 1 to follow, 32 grams of granular poly(ethylene oxide) was obtained by the polymerization of ethylene oxide in contact with calcium amide catalyst and 650 grams of heptane. This poly(ethylene oxide)-heptane mixture then was divided into two equal portions.

*Example 1*

A. To one portion of the poly(ethylene oxide)heptane mixture there was added 5.0 cc. of glacial acetic acid. The resulting mixture was then agitated at room temperature for 20–30 minutes. Subsequently, the poly(ethylene oxide) was separated from the heptane, by filtration, and dried in a desiccator under vacuum at approximately 30° C. The recovered granular poly(ethylene oxide) dissolved in water to give a clear, transparent, water-white solution at room temperature.

B. The remaining portion of the above-described poly(ethylene oxide)-heptane mixture was subjected to filtration to recover the granular poly(ethylene oxide) therefrom. An aqueous solution of this recovered granular poly(ethylene oxide) approximately corresponding to the aqueous solution (on a weight percent basis of polymer) of Example 1A above, was prepared. The resulting aqueous solution was translucent and cloudy at room temperature.

In Examples 2 to 4 to follow, granular poly(ethylene oxide) was prepared in the following manner: To a twenty-gallon stainless steel autoclave held at 50° C. there was charged a heptane slurry of calcium amide catalyst (260 parts by weight of heptane and 1.03 part by weight of catalyst). Over a period of 36.5 hours a mixture of 100 parts by weight of ethylene oxide (38.5 pounds) and 7 parts by weight of butane were fed into the stirred autoclave. The autoclave was maintained at atmospheric pressure during this period of time by venting off 42 parts by weight of ethylene oxide. Granular ethylene oxide polymer (50 parts by weight) was separated, by centrifuging, from the heptane and dried, under vacuum, at room temperature.

*Example 2*

A. A sample of granular poly(ethylene oxide) prepared as described above was dissolved in water by rolling in an eight-ounce bottle at room temperature overnight. The resulting solution contained 0.05 weight percent of poly(ethylene oxide), based on the solution weight. Upon termination of the experiment this solution was examined and found to be translucent and cloudy at room temperature.

B. A two-gram sample of granular poly(ethylene oxide) prepared as described above was slurried, with agitation, for 5 minutes at room temperature in 100 milliliters of heptane containing, dissolved therein, 3.0 weight percent of propionic acid, based on the weight of heptane. Subsequently, the granular poly(ethylene oxide) was recovered by filtration and dried in a desiccator under vacuum at approximately 30° C. An aqueous solution containing 0.05 weight percent of the recovered granular poly(ethylene oxide), based on the solution weight, was examined and ascertained to be clear, transparent and water-white at room temperature.

*Example 3*

A two-gram sample of granular poly(ethylene oxide) prepared as described above was slurried, with agitation, for 15–20 minutes at room temperature in 100 milliliters of dioxane containing 3.0 weight percent of hydrogen chloride, based on the weight of dioxane. The granular poly(ethylene oxide) then was recovered by filtration and dried in a desiccator under vacuum at approximately 30° C. An aqueous solution containing 0.05 weight percent of the recovered granular poly(ethylene oxide), based on the solution weight, was prepared and examined. This solution was observed to be clear, transparent and water-white at room temperature.

Example 4

A. A slurry containing 9.5 pounds of granular poly(ethylene oxide) prepared as described above and 65 pounds of heptane was subjected to centrifugation at room temperature to recover the granular poly(ethylene oxide). This recovered poly(ethylene oxide was reslurried at room temperature for 20–30 minutes in 65 pounds of heptane which contained N,N,N',N'-tetrakis(2-hydroxypropyl)ethylenediamine as a stabilizer against molecular degradation of the polymer. The granular poly(ethylene oxide) again was separated from the heptane by centrifugation, and dried in a desiccator under vacuum at approximately 30° C. The resulting granular poly(ethylene oxide) contained 2 weight percent of N,N,N',N'-tetrakis(2-hydroxypropyl)ethylenediamine, based on the weight of poly(ethylene oxide); the pour angle of the granular ethylene oxide polymer was 80° C. As is well-known the pour angle is a measure of the free flowing characteristics of solids. An aqueous solution containing 1.0 weight percent of the above-treated granular poly(ethylene oxide), based on the solution weight, was prepared at room temperature. The resulting aqueous solution was milky and opaque in appearance.

B. A slurry containing approximately 15 weight percent of granular poly(ethylene oxide) prepared as described above, based on the total weight of poly(ethylene oxide) and heptane, said heptane containing 3.0 weight percent of acetic acid, based on the weight of poly(ethylene oxide), was prepared. The resulting slurry was agitated at room temperature for approximately 30 minutes after which the poly(ethylene oxide) was recovered by centrifuging the slurry. The recovered poly(ethylene oxide) was washed with heptane, and reslurried with additional heptane containing N,N,N',N'-tetrakis(2-hydroxypropyl)ethylenediamine and recovered from the reslurry in the manner described in Example 4A above. The pour angle of the resulting poly(ethylene oxide) was 60° C. An aqueous solution containing 1.0 weight percent of the above-treated granular poly(ethylene oxide), based on the solution weight, was prepared at room temperature. The resulting aqueous solution was transparent and water-clear in appearance.

In Example 5 to follow, granular poly(ethylene oxide) was prepared in the manner described preceding Examples 2–4 above. The resulting granular poly(ethylene oxide)-heptane mixture (approximately 10 weight percent of polymer, based on the total weight of polymer and heptane) was divided into two equal portions.

Example 5

A. To one portion of the poly(ethylene oxide)-heptane mixture there was added 4.38 weight percent of anhydrous propionic acid, based on the weight of poly(ethylene oxide). The resulting slurry was agitated at room temperature for 20–30 minutes; granular poly(ethylene oxide) subsequently was separated from the heptane by centrifugation at room temperature. This recovered granular poly(ethylene oxide) then was reslurried in heptane which contained N,N,N',N'-tetrakis(2-hydroxypropyl)ethylenediamine, the slurry containing approximately 10 weight percent of polymer, based on the total weight of polymer and heptane. The granular poly(ethylene oxide) then was recovered via centrifugation, and dried, as set forth previously in Example 4A. The granular poly(ethylene oxide) now contained approximately 2 weight percent of N,N,N',N' - tetrakis(2 - hydroxypropyl)ethylenediamine, based on the weight of poly(ethylene oxide). The granular poly(ethylene oxide) had a pour angle of 60° C. An aqueous solution containing 1.0 weight percent of the above-treated granular poly(ethylene oxide), based on the solution weight, was prepared. The resulting aqueous solution was transparent and clear at room temperature.

B. To the other portion of the granular poly(ethylene oxide)-heptane mixture no acid was added. The granular poly(ethylene oxide) was recovered by centrifugation, reslurried with heptane containing N,N,N',N'-tetrakis(2 - hydroxypropyl)ethylenediamine, again recovered via centrifugation, and dried, in the manner as described in Example 5A above. The resulting granular poly(ethylene oxide) contained approximately 2 weight percent of N,N,N',N'-tetrakis(2-hydroxypropyl)ethylenediamine, based on the weight of poly(ethylene oxide). The pour angle of this granular poly(ethylene oxide) was 65° C. An aqueous solution containing 1.0 weight percent of this granular poly(ethylene oxide), based on the solution weight, was prepared and examined. The resulting aqueous solution was cloudy and opaque at room temperature.

It is obvious that reasonable variations and modifications of this invention can be made or carried out in the light of the above disclosure, including the illustrative examples, without departing from the spirit and scope thereof.

What is claimed is:

1. A process which comprises slurrying solid poly(alkylene oxide) which contains residual basic divalent metal-containing catalyst therein, with a non-solvent, organic vehicle, said organic vehicle containing acid soluble therein, said acid being selected from the group consisting of strong mineral acids and saturated aliphatic monocarboxylic acids, the anion of said acid being capable of forming with the cation of said residual divalent metal-containing catalyst a water-soluble salt, said organic vehicle containing acid soluble therein in an amount at least sufficient to neutralize said residual basic divalent metal-containing catalyst, for a period of time sufficient to substantially neutralize said catalyst-contaminated poly(alkylene oxide).

2. A process which comprises contacting granular poly(ethylene oxide) which contains residual basic divalent metal-containing catalyst therein, said poly(ethylene oxide) possessing a reduced viscosity value above about 1.0 as determined at a concentration of 0.2 gram of said poly(ethylene oxide) in 100 milliliters of acetonitrile at 30° C., with a non-solvent, organic vehicle, said organic vehicle containing acid soluble therein, said acid being selected from the group consisting of strong mineral acids and saturated aliphatic monocarboxylic acids, the anion of said acid being capable of forming with the cation of said residual divalent metal-containing catalyst a water-soluble salt, said organic vehicle containing acid soluble therein in an amount at least sufficient to neutralize said residual basic divalent metal-containing catalyst, for a period of time sufficient to substantially neutralize said catalyst-contaminated poly(ethylene oxide).

3. A process for neutralizing residual basic catalyst contained in granular poly(ethylene oxide) which possesses a reduced viscosity value above about 1.0 as determined at a concentration of 0.2 gram of said poly(ethylene oxide) in 100 milliliters of acetonitrile at 30° C., said residual catalyst being selected from the group consisting of alkaline earth metal (1) amides, (2) hexammoniates, and (3) the decomposition products of hexammoniates which comprises slurrying the catalyst-contaminated granular poly(ethylene oxide) with a non-solvent, organic vehicle, said slurry containing up to approximately 30 weight percent of poly(ethylene oxide), based on the total weight of said organic vehicle and said poly(ethylene oxide), said organic vehicle containing acid soluble therein, said acid being selected from the group consisting of strong mineral acids and saturated aliphatic monocarboxylic acids, the anion of said acid being capable of forming with the alkaline earth metal cation a water-soluble salt, said organic vehicle containing said acid in an amount at least sufficient to neutralize said residual basic catalyst, for a period of time sufficient to substantially neutralize said catalyst-contaminated poly(ethylene oxide).

4. The process of claim 2 wherein said residual basic catalyst is selected from the group consisting of alkaline earth metal (1) amides, (2) hexammoniates, and (3) the decomposition products of hexammoniates.

5. The process of claim 4 wherein said acid is a strong mineral acid.

6. The process of claim 4 wherein said acid is a saturated aliphatic monocarboxylic acid.

7. The process of claim 3 wherein said slurry contains from about 5.0 to about 20 weight percent of poly(ethylene oxide), based on the total weight of said poly(ethylene oxide) and said nonsolvent, organic medium.

8. The process of claim 7 wherein said nonsolvent, organic medium is a normally liquid saturated hydrocarbon which is a nonsolvent for said poly(ethylene oxide).

9. The process of claim 8 wherein the slurry is maintained at a temperature in the range of from about 20° to about 55° C.

10. The process of claim 9 wherein the upper limit of said acid concentration is about 20 weight percent, based on the weight of said normally liquid saturated hydrocarbon.

11. The process according to claim 10 wherein said catalyst is calcium amide, wherein said acid is acetic acid, and wherein said nonsolvent, organic vehicle is heptane.

12. The process according to claim 10 wherein said catalyst is calcium amide, wherein said acid is propionic acid, and wherein said nonsolvent, organic vehicle is heptane.

13. The process according to claim 10 wherein said catalyst is calcium amide, wherein said acid is hydrogen chloride, and wherein said nonsolvent, organic vehicle is dioxane.

14. A process for neutralizing residual basic catalyst contained in granular poly(ethylene oxide) having a reduced viscosity value in the range of from about 1.0 to about 60 as determined at a concentration of 0.2 gram of said poly(ethylene oxide) in 100 milliliters of acetonitrile at 30° C., said residual catalyst being selected from the group consisting of alkaline earth metal (1) amides, (2) hexammoniates, and (3) the decomposition products of hexammoniates, which comprises contacting said granular poly(ethylene oxide) with a normally liquid saturated aliphatic hydrocarbon which is a nonsolvent for said poly(ethylene oxide), said aliphatic hydrocarbon containing saturated aliphatic monocarboxylic acid soluble therein, the anion of said acid being capable of forming with the alkaline earth metal cation a water-soluble salt, said aliphatic hydrocarbon containing acid soluble therein in an amount at least sufficient to neutralize said residual catalyst; maintaining the resulting slurry at a temperature in the range of from about 20° to about 50° C., for a period of time sufficient to substantially neutralize said catalyst-contaminated poly(ethylene oxide), and recovering said poly(ethylene oxide) in its original granular state.

15. The process of claim 14 wherein said saturated aliphatic monocarboxylic acid contains from one to three carbon atoms.

16. The process of claim 15 wherein the resulting slurry contains from about 5 to about 20 weight percent of poly(ethylene oxide), based on the total weight of said poly(ethylene oxide) and said normally liquid saturated aliphatic hydrocarbon.

17. The process of claim 16 wherein the granular poly(ethylene oxide) product is subjected to at least one extraction with a normally liquid saturated hydrocarbon which is a nonsolvent for said granular poly(ethylene oxide).

References Cited in the file of this patent

UNITED STATES PATENTS

| | | |
|---|---|---|
| 2,075,429 | Douglass | Mar. 30, 1937 |
| 2,084,415 | Strain | June 22, 1937 |
| 2,706,182 | Pruitt et al. | Apr. 12, 1955 |